(12) United States Patent
Edmondson et al.

(10) Patent No.: US 10,726,454 B2
(45) Date of Patent: Jul. 28, 2020

(54) SYSTEM AND METHOD FOR RECLAIMING RESIDUAL VALUE OF PERSONAL ELECTRONIC DEVICES

(71) Applicant: Hyla, Inc., Farmer's Branch, TX (US)

(72) Inventors: David J. Edmondson, Dallas, TX (US); Biju Nair, Long Grove, IL (US)

(73) Assignee: Hyla, Inc., Farmers Branch, TX (US)

( * ) Notice: Subject to any disclaimer, the term of this patent is extended or adjusted under 35 U.S.C. 154(b) by 0 days.

(21) Appl. No.: 14/519,657

(22) Filed: Oct. 21, 2014

(65) Prior Publication Data

US 2015/0206200 A1 Jul. 23, 2015

Related U.S. Application Data

(60) Provisional application No. 61/928,690, filed on Jan. 17, 2014, provisional application No. 62/024,807, filed on Jul. 15, 2014.

(51) Int. Cl.
*G06Q 30/02* (2012.01)
*G06Q 10/00* (2012.01)
*H04M 1/24* (2006.01)

(52) U.S. Cl.
CPC ......... *G06Q 30/0278* (2013.01); *G06Q 10/30* (2013.01); *G06Q 30/0201* (2013.01);
(Continued)

(58) Field of Classification Search
CPC ............... G06Q 10/30; G06Q 30/0278; G06Q 30/0201; G06Q 30/0206; H04M 1/24; Y02W 90/20

(Continued)

(56) References Cited

U.S. PATENT DOCUMENTS 5,785,666 A * 7/1998 Costello ................. A61B 5/486
600/409
7,020,782 B2 * 3/2006 Rajasekaran ....... G06F 16/9014
726/22

(Continued)

OTHER PUBLICATIONS

Kelley Blue Book, "Q: What is Trade-In Value?", retrieved Jul. 20, 2016, published Dec. 17, 2013, 2 pages, http://www.kbb.com/what-is/trade-in-value/.*

(Continued)

*Primary Examiner* — Gerardo Araque, Jr.
(74) *Attorney, Agent, or Firm* — Ferguson Braswell Fraser Kubasta PC

(57) ABSTRACT

Described herein is a mobile device trade-in facilitation system comprising: one or more servers configured to interact with one or more external data sources; a mobile application communication center configured to interact with one or more mobile devices; an analytic database; and a main processor configured to: initiate a trade-in value calculation based upon an event related to a mobile device; receive information from the mobile device related to characteristics of the mobile device via the mobile application communication center; receive first data related to the mobile device from the one or more servers; retrieve second data related to the mobile device from the analytic database; determine a trade-in value for the mobile device based upon one or more of: the information, the first data, and the second data; and transmit the trade-in value to the mobile device.

21 Claims, 9 Drawing Sheets

(52) U.S. Cl.
CPC .......... *G06Q 30/0206* (2013.01); *H04M 1/24* (2013.01); *Y02W 90/20* (2015.05)

(58) Field of Classification Search
USPC .......... 705/14.1, 14.11, 14.13, 14.17, 14.19, 705/14.2, 14.25, 14.35, 14.36, 14.37, 705/14.39, 308
See application file for complete search history.

(56) References Cited

U.S. PATENT DOCUMENTS

| | | | |
|---|---|---|---|
| 8,195,511 B2* | 6/2012 | Bowles et al. | 705/14.37 |
| 10,001,878 B2 | 6/2018 | Wood et al. | |
| 2006/0178933 A1* | 8/2006 | Fitzgerald et al. | 705/14 |
| 2006/0256725 A1 | 11/2006 | Engel | |
| 2010/0053604 A1 | 3/2010 | Rice | |
| 2010/0100229 A1* | 4/2010 | Whitson et al. | 700/225 |
| 2010/0161397 A1* | 6/2010 | Gauthier et al. | 705/14.4 |
| 2010/0228676 A1 | 9/2010 | Librizzi et al. | |
| 2011/0050617 A1* | 3/2011 | Murphy | G06F 3/0418 345/174 |
| 2011/0060945 A1 | 3/2011 | Leprince et al. | |
| 2012/0029947 A1* | 2/2012 | Wooldridge | G06Q 40/08 705/4 |
| 2012/0259833 A1 | 10/2012 | Paduroiu | |
| 2013/0132175 A1* | 5/2013 | Claessen et al. | 705/14.17 |
| 2013/0144797 A1 | 6/2013 | Bowles et al. | |
| 2013/0246211 A1 | 9/2013 | Sullivan | |
| 2013/0246212 A1* | 9/2013 | Sullivan | 705/26.4 |
| 2014/0066798 A1* | 3/2014 | Albert | A61B 5/0452 600/513 |
| 2014/0069195 A1* | 3/2014 | Ledbetter | G01H 1/00 73/649 |
| 2014/0253494 A1 | 9/2014 | Jiang et al. | |
| 2015/0120485 A1 | 4/2015 | Nash | |
| 2016/0315652 A1 | 10/2016 | Tabatabai et al. | |
| 2016/0342560 A1 | 11/2016 | Hulbert et al. | |
| 2017/0056928 A1 | 3/2017 | Torrione | |
| 2017/0110898 A1 | 4/2017 | Kyriakoulis et al. | |

OTHER PUBLICATIONS

J. Cho, I. Hwang and S. Oh, "Vibration-Based Surface Recognition for Snnartphones," 2012 IEEE International Conference on Embedded and Real-Time Computing Systems and Applications, Seoul, 2012, pp. 459-464. (Year: 2012).*

PCT/US2015/011199 International Search Report and Written Openion dated Apr. 9, 2015.

Weiss, Helmut, "Hello Totem get Cash for your Old Cell Phones Fast.Free Quote"; <http://hellototemreviewbuyback-cellphones.blogspot.com/2012/06/hellototem-buyback-cellphones-option.html>: Jun. 19, 2012 (4 pages).

Quraishi, Jen, What Happens to Your Phone When You Recycle It?; <https://www.motherjones.com/politics/2010/11/what-happens-your-phone-when-you-recycle-it/>; Nov. 15, 2010 (4 pages).

Alec, "Can I install this iPhone 5s home button on my iPhone 5?"; <https://www.ifixit.com/Answers/View/185840/Can+I+install+this+iPhone+5s+home+button+on+my+iPhone+5>; Posted Aug. 10, 2014 (3 pages).

* cited by examiner

SYSTEM AND METHOD FOR RECLAIMING RESIDUAL VALUE OF PERSONAL ELECTRONIC DEVICES

RELATED APPLICATIONS

This application claims priority to U.S. Provisional Patent Application 61/928,690 filed Jan. 17, 2014 and U.S. Provisional Patent Application 62/024,807 filed Jul. 15, 2014. The entirety of these provisional patent applications are hereby incorporated by reference.

TECHNICAL FIELD

The present disclosure relates generally to systems and methods that provide for the reclamation of residual value of personal electronic devices.

BACKGROUND

Millions of mobile devices are sold annually. As used herein, mobile device may refer to transportable devices such as mobile telephones, smartphones, personal digital assistants, handheld devices, tablets, nettops, or laptop computers, and similar devices that have mobile communications capabilities. Consumers with business needs and/or financial means regularly upgrade/change their mobile devices as technology advances. Oftentimes many used mobile devices are simply forgotten by their owners' when replaced by newer devices. Used mobile devices may go unused, resulting in wasted resources, that could otherwise be repurposed for use by other users or for extracting components for use in other electronic devices.

SUMMARY

A system and method for reclaiming residual value of a mobile device are described herein. Consumers or wireless carriers may be enabled to initiate trade-in of a mobile device. The approach herein may include a mobile device centric approach that enable features and capabilities on a mobile device to capture relevant data for use in the trade-in procedure. The information captured at the device may be used in conjunction with a cloud-based data repository that contain data related to many mobile device models. In some cases, thousands of models may be cataloged in the cloud-based data repository.

An interface may exist at the mobile device to allow a mobile device recycler to receive and compile relevant information and provide a residual value estimation to the user of the mobile device. The residual value estimation may be based on a number of factors, including capabilities of the mobile device, use profiles of the mobile device, secondary market demand for the mobile device, and other relevant characteristics.

Information resident in a cellular or other electronic device would include, but not be limited to, parameters or information used to determine parameters such as usage time, device location, make, model, age, OS and firmware version, battery life and frequency of keyboard usage. With an analytic availability, information resident in a cellular device could help determine how "well" the device is operating in terms of radio performance, device speed, GPS performance, network speed, memory speed, battery performance and availability, keyboard and screen performance, and other metrics not limited to the ones cited above. The system further could provide a listing of locations where a consumer could exchange a cellular device for its residual value, prioritized by geographical proximity to the device owner's current location and further ease the process by integrating the ability to navigate to that location using the navigation capabilities available in the device.

In other words, information resident in a cellular device can be analyzed to determine the device's residual value in a given location based on parameters extracted from the device, parameters determined from secondary factors including the available market for the device, billing parameters from the carriers' billing system such as the customer's upgrade eligibility, and parameters analytically determined by the performance of the phone under a set of tests or measurements. The system can thus determine a device's residual value through an analysis combining, among other things, information resident in the device, secondary factors such as market demand, and the specific device's performance in a set of measured tests.

The system can also remind the user about the residual value based on certain event-triggers. Examples of such event triggers could be geographical or physical-based events, but would not be limited to those. When a device owner happens to be in the proximity of a recycling facility, the application resident on the device can automatically "pop up" the information regarding the current retained value of the device and further enrich that information by forecasting the future value of that device as a function of time, thereby empowering the device owner with complete and valuable information that he or she may require to make an informed decision regarding the device. Examples of physical triggers include events, such as power recycling (random restarts or re-boots) of the phone or device, or faster than factory estimated needs to charge the battery, indicating deterioration of battery life. Physical triggers are good indicators of a potential frustration of a user with her existing device and the decision to upgrade to a better/newer device. The system may also prompt the user for their decision to upgrade/recycle the device, which will set a series of activities in motion as described further herein.

Users of connected devices wishing to exchange their old devices for new devices may automatically perform the required tasks prior to an exchange. Such activities may be laborious and time consuming for customers that have to wait in a retail store for extended periods of time resulting in wasted time for them, lost productivity for retail store personnel, and a bad experience for everyone. Automatically performing the required tasks prior to an exchange may alleviate the lost time and lost productivity.

The present application describes an automated, on-device process that implements and automates several methods in a coherent flow to enable a customer to "self-drive" through the device exchange process. Such automated process and methods may be implemented into a stand-alone application on the connected device or seamlessly integrated into other applications that currently serve customer care functions on the device.

The processes described herein may create natural and intuitive flows to the tasks that make it easy for the user to follow and complete the trade-in process. Through process automation, the described embodiments aim to dramatically reduce the amount of time (and the corresponding expense) required to be spent at a retail store performing tasks that can be done outside of the store.

BRIEF DESCRIPTION OF THE DRAWINGS

For a more complete understanding of the present disclosure and its advantages, reference is now made to the following description taken in conjunction with the accompanying drawings, in which like reference numbers indicate like features.

Although similar reference numbers may be used to refer to similar elements for convenience, it can be appreciated that each of the various example embodiments may be considered distinct variations.

DETAILED DESCRIPTION

Figure 1:
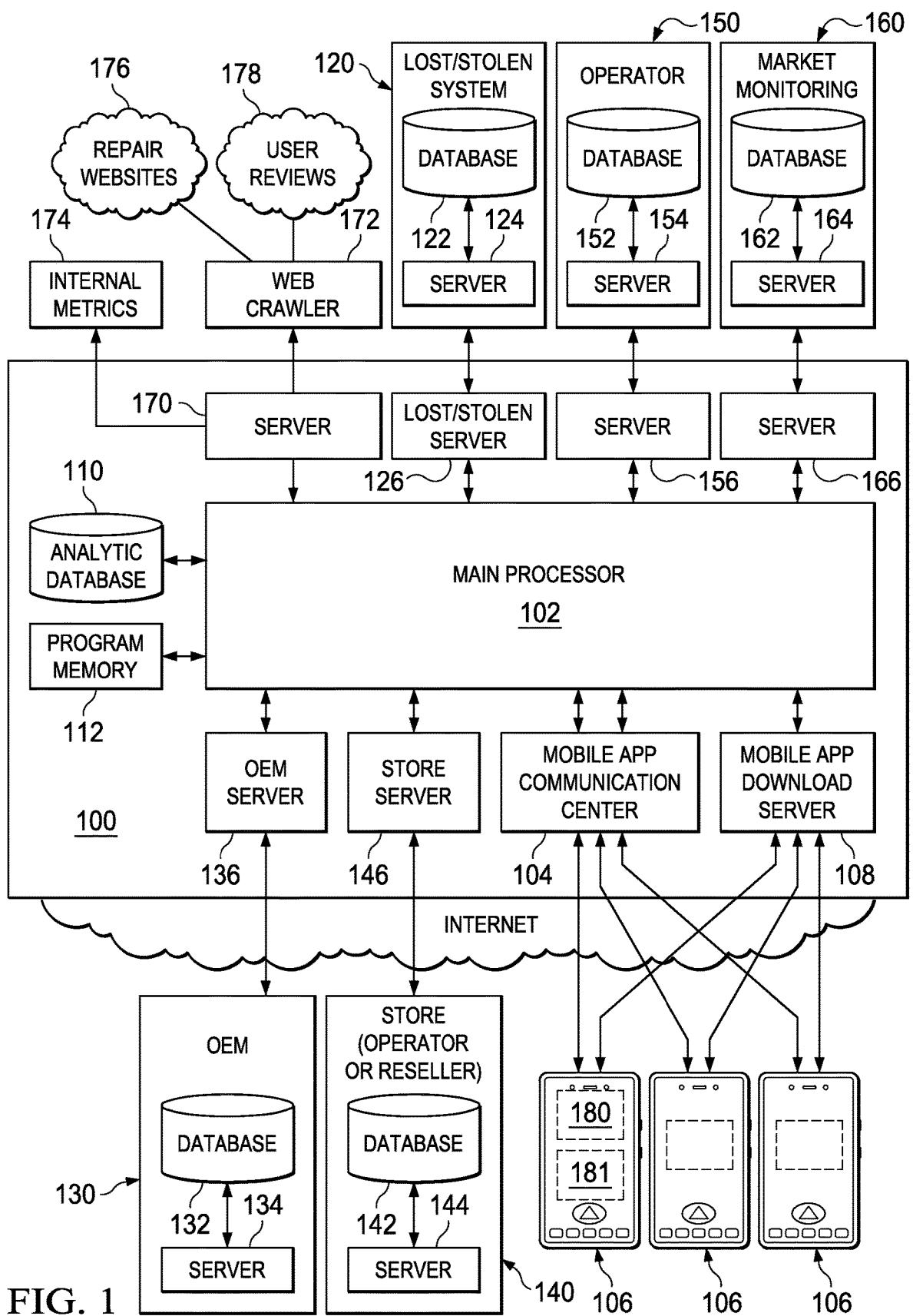
FIG. 1 illustrates an example embodiment of a system employed by the technology disclosed herein.

Although programs exist for resale or recycling of personal electronic devices, there are no efficient systems that streamline the return of personal electronic devices though the use of the devices themselves, whereby at least the parameters inherently embedded within the electronic device itself can be immediately transmitted and inputted into the system for determining residual value. The presently disclosed embodiments may be applied to form comprehensive systems that use the embedded information within the electronic device in conjunction with databases specifying baseline values, regional variances for such values, whether the electronic devices appear on lost/stolen lists, and many other aspects.

In a described embodiment of the transaction associated with a device bring-back, there may be three stages of preparation or processing involved: on-device activities, in-store preparation for trade-in, and back-office processing. The time associated with in-store transactions and back-office processing may be important to retail stores and other parts of a wireless ecosystem as the time spent may affect customer satisfaction, increase costs, and accordingly such time losses may affect the ability to generate revenue associated with used devices, which often significantly lose value in the marketplace if not made available in a timely fashion. The described embodiments may aid in improving the processing or transaction time associated with each stage. For example, pre-trade-in activities conducted by the subscriber on-device may be recorded and uploaded to cloud-based storage. The next stage of the transaction that potentially happens in a retail store according to the described embodiments may retrieve the previously stored pre-trade-in activities by using the device's unique identifier (such as an IMEI or other identifier) and potentially eliminate the need for performing the pre-trade-in activities at the retail store. Similarly, when the device arrives at the processing center, the processing solution may access the cloud-based storage using the same device ID and determine which activities in the processing chain have been completed satisfactorily and may be eliminated from the final processing steps, thereby creating significant efficiencies in the overall processing time associated with a device return/trade-in.

Effective processing time of a returned mobile device may be defined as the summation of all back-office processing time less retail store processing time and less on-device processing time. The summation of back-office processing time may include inspection time, repair time, or other processing that occurs after the device is shipped from a retail store to the back office. Retail store processing time may include inspecting the mobile device, and entering information related to the mobile device into a system for processing. On-device processing time my include any pre-trade-in activities that a user may accomplish on the device before visiting a retail store. Thus, accomplishing activities on the mobile device prior to trade in may decrease the effective processing time of a mobile device, indicating efficiencies gained in the trade-in process.

FIG. 1 is an embodiment of a system 100 employed to process mobile devices in accordance with the description provided herein. The system 100 may comprise a main processor 102 that is operable to communicate with a mobile device communications server 104, which in turn may communicate with multiple mobile devices 106 that may engage with the system 100 for the purposes of determining possible residual value of a mobile device 106 and/or initiating the return of the mobile device 106 into the system 100 for value. As used herein, value may include cash, credit, incentives, or any other equivalent of monetary worth.

The present system 100 may utilize an interface directly installed on and/or connected to the mobile devices 106, e.g., not solely a web browser running upon the mobile devices 106; such an interface might be an "app" running on the mobile devices 106 or another direct interface, API-focused connection, another type of direct, remote communication channel, or the like to glean parameters associated with the mobile devices 106 for use in determining a residual value of the mobile device 106. Such parameters may include usage time, device location, make, model, age, keyboard usage (e.g. number of times used), or other parameters that may affect the value of the mobile device. One way (but not the only way) to provide for communication between the mobile devices 106 and the communications server 104 is through a resident app downloaded to the mobile devices 106 such as through a mobile app download server 108, which may host apps to be downloaded to various types of mobile devices 106.

Although this mobile app download server 108 is shown as a part of the system 100, the server may be implemented through a variety of options. First, a device user may download the app through a separate "app store" such as the download stores provided for iOS, Android, Microsoft, and Blackberry mobile apps. Second, cellular carriers, such as AT&T, Verizon, or Sprint, may embed the app in a mobile device 106 after is obtained from the Original Equipment Manufacturer (OEM) but before it is purchased by a user. Third, an OEM that creates the operating system installed on a mobile device 106, such as Apple, Google, or Microsoft, may embed the app in a device before it is distributed to a cellular carrier. Fourth, an OEM that creates a mobile device, such as Apple, Samsung, or Motorola, may embed the app in a mobile device 106 before it is installed with an operating system and distributed to cellular carriers. Fifth, a third party provider of customization solutions for new or used mobile devices 106 may embed the app in the in a mobile device 106 before the mobile device 106 is further distributed to the mobile eco-system. While various methods to embed the app in a mobile device 106 have been described, it should be understood that they have been presented by way of example only, and not as limitation.

Further, within the system 100, the main processor 102 may communicate with the mobile devices 106 not only to retrieve embedded information relative to those mobile devices 106, but also to compile relevant information from external sources or through analysis. With those capabilities, a full device profile may be built and stored in an analytic database 110. As a particular example, the main processor 102 may communicate with a lost/stolen system 120 to access a lost/stolen database 122 through respective servers 126, 124, and accordingly determine whether the phone itself has been identified as lost or stolen. In this case a trade in may be denied for a mobile device 106 that has been reported lost or stolen.

As another example of data gathering in support of the residual value calculation, the main processor 102 may contact OEM system 130 to access an OEM database 132 through respective servers 136, 134 to gather either or both of the general phone model information and phone-specific metrics according to what is stored in the OEM database 132 regarding that mobile device 106. The "index" used for this type of inquiry may be a mobile device's IMEI number or serial number or another type of device serial number for a mobile device 106. The types of information available from OEM database 132 might include whether the mobile device 106 has been reconditioned, manufacturing details, the mobile device's hardware and software configurations, warranty claim information, and contemplated upgrades/revisions.

As another example of data gathering in support of the residual value calculation, the main processor 102 may contact an operator system 150 to access an operator database 152 through respective servers 156, 154 to gather metrics relating to the mobile device 106 according to the data stored therein. Relevant metrics that may be pulled from an operator database 152 may include usage minutes, number of texts, eligibility for upgrade (age of contract), or other relevant usage information or other types of metrics to the extent that information is compiled by a phone system operator or other connected service provider.

Operators may be regulated on their use of customer proprietary network information (CPNI) and may be precluded from disclosing the information to third parties without the consumer's consent. Again, this type of information may all be indexed and matched up with data from other data sources according to the mobile device's IMEI number or another type of serial number associated with another type of mobile device 106. Other types of information available may include information on mobile device returns, warranty information and the like.

As another example of data gathering in support of the residual value calculation, the main processor 102 may contact a market monitoring system 160 to access a market monitoring database 162 via servers 164, 166. Market monitoring database 162 may contain information related to market shockwave dynamics. For example, when a new version of a mobile device is released, a shockwave may be felt on the market relative to the value of a mobile device. In other words, when a new model of a device is releases, the value of the old model may experience a sudden change. The market monitoring database 162 may comprise information relative to release dates of mobile devices, historic information related to changes in price after a release, or other information related to changes in mobile device value after a change in the market.

As another example of data gathering in support of the residual value calculation, the main processor 102 may contact a web crawler 172 via a server 170. Web crawler 172 may gather data from various mobile device repair websites 176. This data may be used, for example, to determine the frequency of breakage on a certain type of mobile device. Web crawler 172 may also gather data from various user review websites 178. This data may also be beneficial in determining a value of a mobile device, for example the longevity of the mobile device. Social intelligence server 172 may also interact with internal metrics server 174. Internal metrics server 174 may be one or more servers that collect and store metrics related to mobile device returns, prices, or other mobile device data available on the web.

Using any or all of the above data sources, as well as additional sources, data may be accumulated/federated by main processor 102 and stored in the analytic database 110 of the system 100. Further, mobile device 106 may interact with the main processor 102 through the mobile application communication center 104 and/or the respective store servers 146 (within the system 100) and server 144 (at a store location) additional information can be fed into the system for processing of the contemplated mobile device return/ exchange. For example, a store clerk interacting with the store server 144 or a user interacting with a mobile device 106 may upload subjective or objective indicia giving additional relative value weightings to the residual value of the mobile device 106. In some cases, a photograph of the device may be uploaded for assessment by a remote operator and/or later verification of the physical condition of a returned mobile device 106.

In some embodiments, as a part of a downloaded "app" or embedded operating code within a mobile device 106, analytic tools may be used to determine the overall "health" of the mobile device 106. For example, the mobile device's relative network speed, memory speed, battery performance, or other performance parameters, may be measured and compared to a baseline for similar mobile devices 106. This information may additionally be stored in the analytic database 110 and may be used for calculation of a residual value.

The system 100 may provide mobile device 106 with real-time updates of the closest available return site or the highest returned residual value "bid" for the device. For example one purchaser may offer more for a mobile device 106 than another. Further, through "push" notifications, a user may be notified immediately of possible return offers for their mobile device whereby the user may be immediately induced to upgrade to a new mobile device upon learning the residual value that they will receive for their current mobile device in exchange for their mobile device upgrade. These techniques may be used to increase the velocity of mobile device turnover and improve efficiency of the mobile device market.

A program memory 112 is provided in the system 100 to communicate with the main processor 102 and to provide computer-readable instructions for the system 100 to perform the tasks described in the disclosed embodiments. The computer-readable instructions could be provided on a program disk or could be stored and/or executed through cloud-based computing or other networking and/or storage provided physically separately from other parts of the system 100. In fact, the system 100 could employ a single server, multiple distributed computers, or a virtual computing instance remotely operating jobs assigned to it from the main processor 102 or from a different entity from the system 100.

The computer-readable instructions would accordingly include instructions for performing the tasks described in the flowcharts included with this application, as well as other tasks implicitly based on the system operations described herein. The applications described herein for running on the remote devices 106 may be downloadable apps as mentioned, but they would not have to be. The remote devices 106 may use program memories 181 and to the extent the applications are downloadable apps such downloadable apps may be stored on the program memories 181 for operation by connected processors 180 within the remote devices 106.

Figure 2:
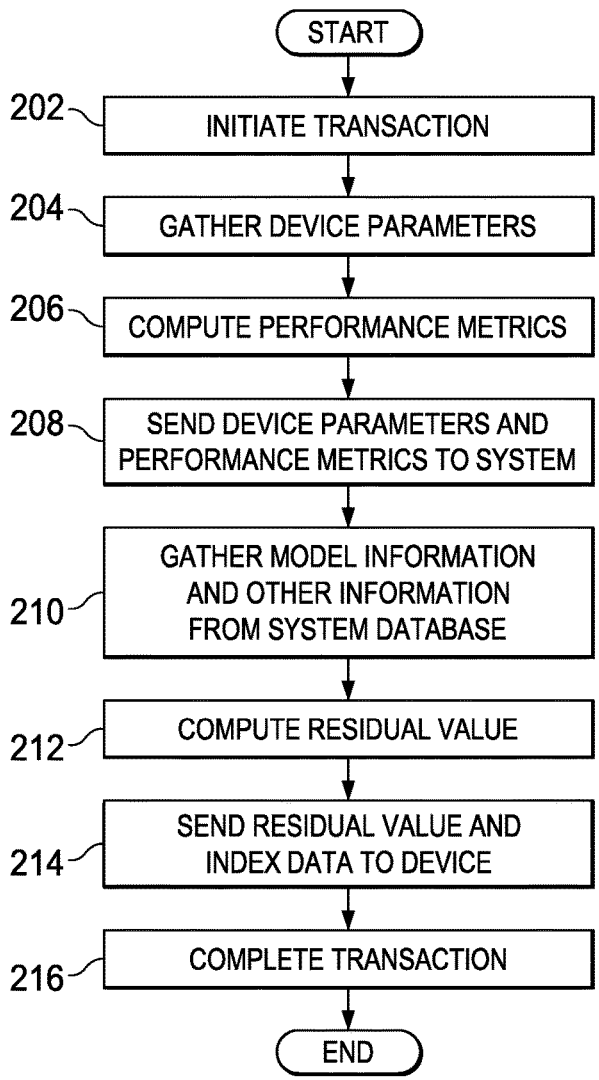
FIG. 2 is a flowchart of a method for determining the residual value of a mobile device.

FIG. 2 is a flowchart of a method for determining the residual value of a mobile device. The method starts at step 202 where a residual value calculation transaction may be initiated. The transaction may be initiated as a "pull" transaction, where a mobile device user may start an application that would initiate the transaction with the system 100. In other embodiments, the transaction may be a "push" transaction where the system 100 may alert the user to the possible transaction. It should be understood that an "application" in this context is a broader concept than a mobile device "app," wherein this application may be any code or method by which the mobile device 106 interacts with the system 100 to gather phone parameters or operating analytics and ultimately provide a conduit from the system 100 to the user to facilitate a recovery transaction by which the user is given value for their mobile device 106. It also should be noted that the application might be an "app" such as would be downloaded from a mobile app download server 108.

Still referring to step 202, the application may communicate with the mobile application communication server 104 to transmit data to and from the system 100. The mobile application communication server 104 may communicate with multiple mobile devices 106 to effect these types of transactions. The main processor 102 accordingly may receive device parameters at step 204 and/or compute performance metrics at step 206 through communication with the mobile electronic devices 106 via the mobile application communication server 104. In some embodiments, main processor 102 may communicate with the mobile device 106 via other means not shown in FIG. 1.

At step 208, the gathered device parameters and the performance metrics of the mobile device may be sent to the main processor 102. At step 210, the main processor 102 may further operate to gather information about the mobile device using model numbers, IMEI numbers, or other identifying information sent from the mobile device. The main processor 102 may consult external systems with relevant information about the mobile device such as operator systems 150 and/or OEM systems 130. Further, the main processor 102 at this step or at another point in the process my consult a lost/stolen database 122 to determine whether the mobile device 106 is being used legitimately by its user. The OEM database 132 may include information about a particular model of a mobile device's features, which can in turn be used in a residual value calculation for the mobile device 106. Information gleaned from the operator database 152 may include metrics such as device usage data (number of minutes, data downloaded, or other usage indicator) that also may be indicative of device residual value. Some or all of the information gathered in one or more of steps 204,206, 208, 210 may be stored in the analytic database 110 for use by the main processor 102.

At step 212, the main processor 102 may compute a residual value of a mobile device 106 that has been in communication with the processor 102 through the mobile application communication server 104. The main processor 102 may further receive data that has been stored in the database 110 during prior actions. As shown in action 214, the main processor may then transmit the residual value to the user of the mobile device 106, whereby the user may be informed and/or approve of the residual value determination.

Still referring to step 214, and presuming the user wishes to exchange their mobile device 106 at this time, an index data indicator may be transmitted to the mobile device 106, whereby the device may be synchronized with existing transaction records when being returned to a physical location for redemption. At step 216, once the device 106 has been returned for redemption, the return action may be "completed," although there may be many additional actions performed at this point by the processing system 100 to process, wipe, recondition, and/or resell the processed device to another entity or user.

Figure 3:
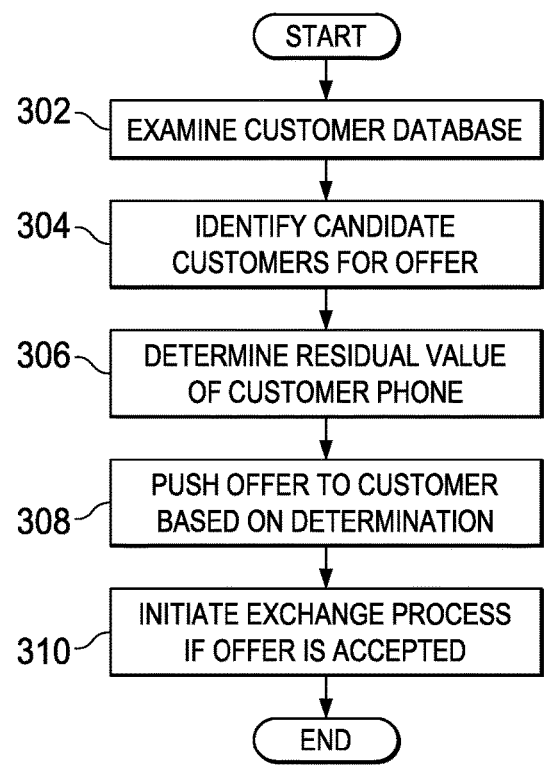
FIG. 3 is a flowchart of a method by which a user can be informed of a value for his or her mobile device and encouraged to exchange it for an upgraded model.

Referring now to FIG. 3, a flowchart of a method by which a user may be informed of a value for his or her mobile device and encouraged to exchange it for an upgraded model is shown. This method may provide an exemplary method of a specific approach by which the system 100 may encourage mobile device users (such as cell phone users) who are not otherwise seeking to exchange their devices to go ahead and do so. By being able to provide an immediate residual value for the user's devices, the system may "push" an alert to a user and potentially increase the turnover velocity for the users to acquire new, more desirable electronic devices.

At step 302 the main processor 102 may examine a user database, such as the analytic database 110, and determine which of the systems' connected users may be particularly suited to exchange their electronic devices. For example, a user may have had their mobile device for a certain period of time or the mobile device may be of a certain age. At step 304, a user (and his or her affiliated device 106) may be identified, and a relevant offer may be further identified for that user. At step 306, using the methods previously described or similar methods, the residual value of the device may be determined, whereby such residual value may be communicated to the user along with the relevant offer. At step 308, the processor 102 may "push" the offer and the device's residual value to the user based on the above determinations, and should the offer be accepted by a user, the process of exchanging the user's mobile device or phone 106 for value may begin, as shown at step 310.

Figure 4:
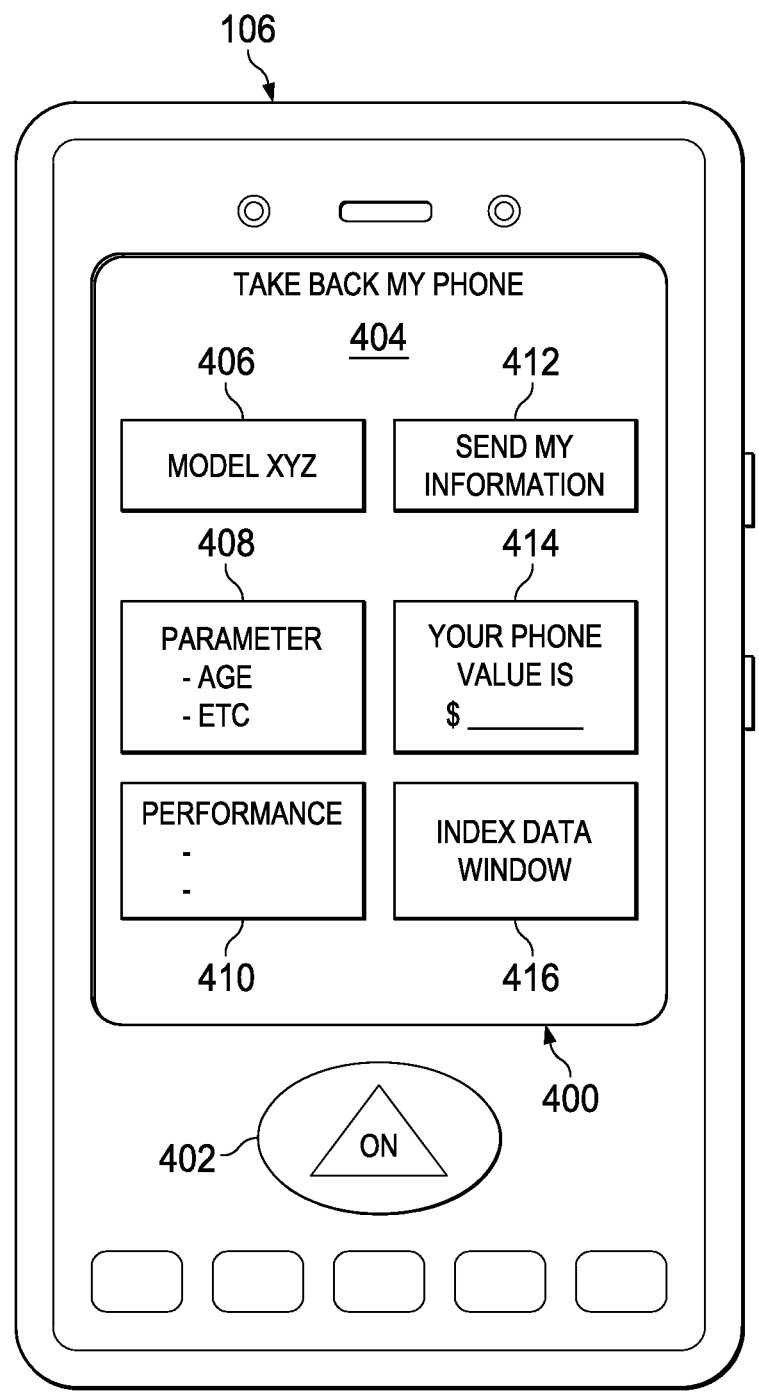
FIG. 4 is a screen shot of a possible interface for interacting with the user of a mobile device.

Illustrated in FIG. 4 is a screen shot of a user interface 400 for interacting with the user of a mobile device 106. The screen shot may be the interface to an application running on the mobile device 106 and may be operable to allow the user to interact with the system 100 as described in the methods above and in other possible methods used to facilitate the exchange of mobile devices 106 for value in accordance with the disclosed embodiments. The "on" button 402 may show the context for the user interface 400 on the device 106. The banner 404 may indicate the general functionality and/or trademark that might be associated with the application shown on the user interface 400. A window 404 may be used to provide an indicator of the device on which the application is residing, and extracted parameters associated with the device 106 may be shown in window 408. Various performance indicators may be provided for informational purposes on window 401.

A "send my information" button 412 may be provided to initiate a transaction, whereby the "results" of a residual value inquiry transaction may be displayed in window 414. Other offers may be presented to the user through window 414, or such information or offers may be provided to the user through email, text, phone call, or other forms of communication. Further, window 416 may illustrate the concept of providing index data to be associated with a user device 106. This index data may be a QR code or other code that may be used in the actual physical intake process for a device to be exchanged. As otherwise discussed in the present application, the methods and interfaces described herein are exemplary and may be changed according to design needs and/or marketing goals. Many different approaches are possible and are to be considered within the scope of any claims issuing from the present application according to the principles described in this application.

Figure 5:
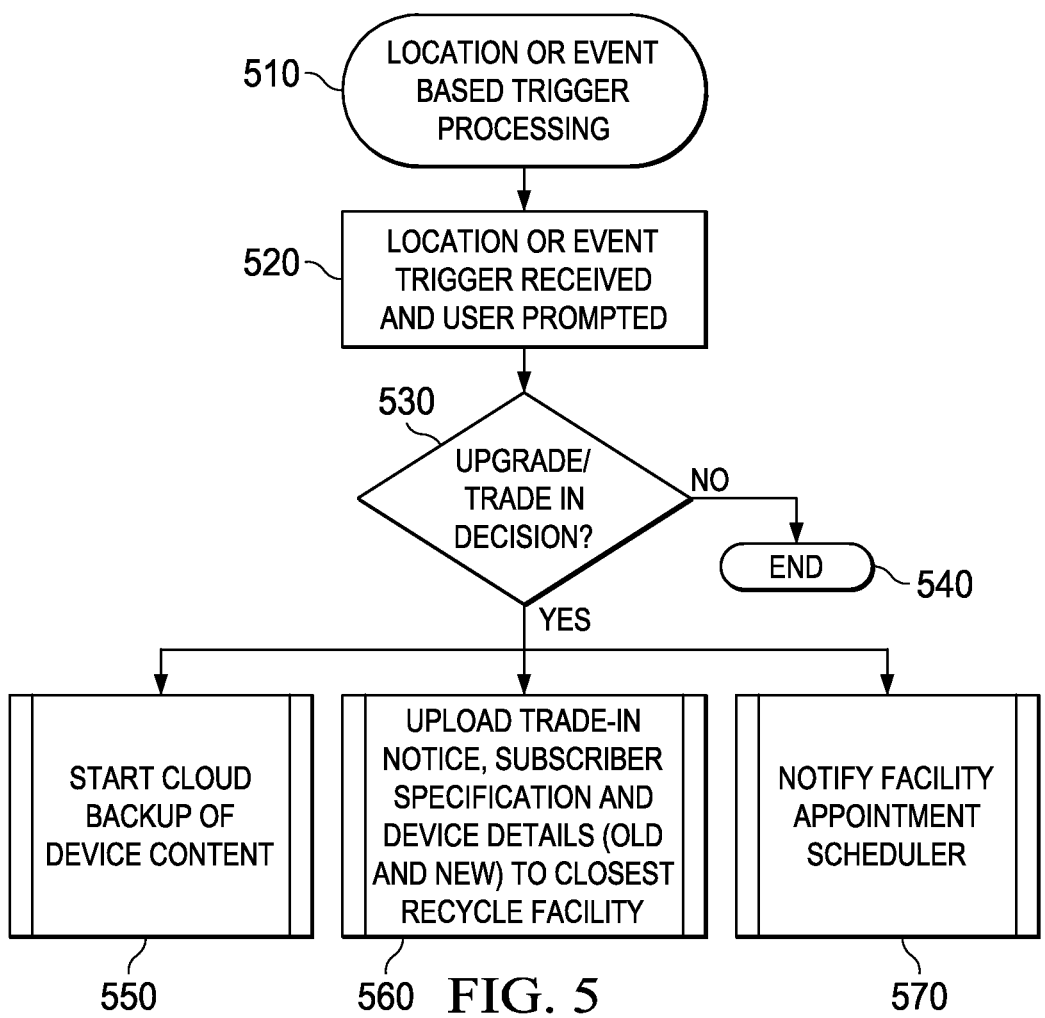
FIG. 5 is a flowchart of a method by which the software application on the device may process location or physical-based event triggers.

Referring now to FIG. 5 a flowchart of a method depicting the processes that occur after a user elects to upgrade or trade in his or her current mobile device. At step 510, a trigger may occur based on a location of the mobile device or an event, for example a user initiating the trade in or an automatic prompt from the carrier billing system or marketing promotion system that determined that the subscriber is eligible for an upgrade. At step 520, the trigger is received at the system 100 and the user is prompted to upgrade or trade-in their mobile device. At step 530, the user may decide not to accept the upgrade/trade-in offer in which case the method ends at step 540. In the alternative, at step 530, the user may decide to accept the upgrade/trade-in offer in which case the method continues to step 550, where a back-up of the mobile device may occur. Data from the mobile device may be backed up to a cloud-based back-up service. At step 560, the trade-in notice subscriber specification, and device details may be uploaded to the nearest recycle facility. Finally, at step 570, the recycle facility appointment scheduler may be notified that the mobile device is inbound for processing.

Figure 6:
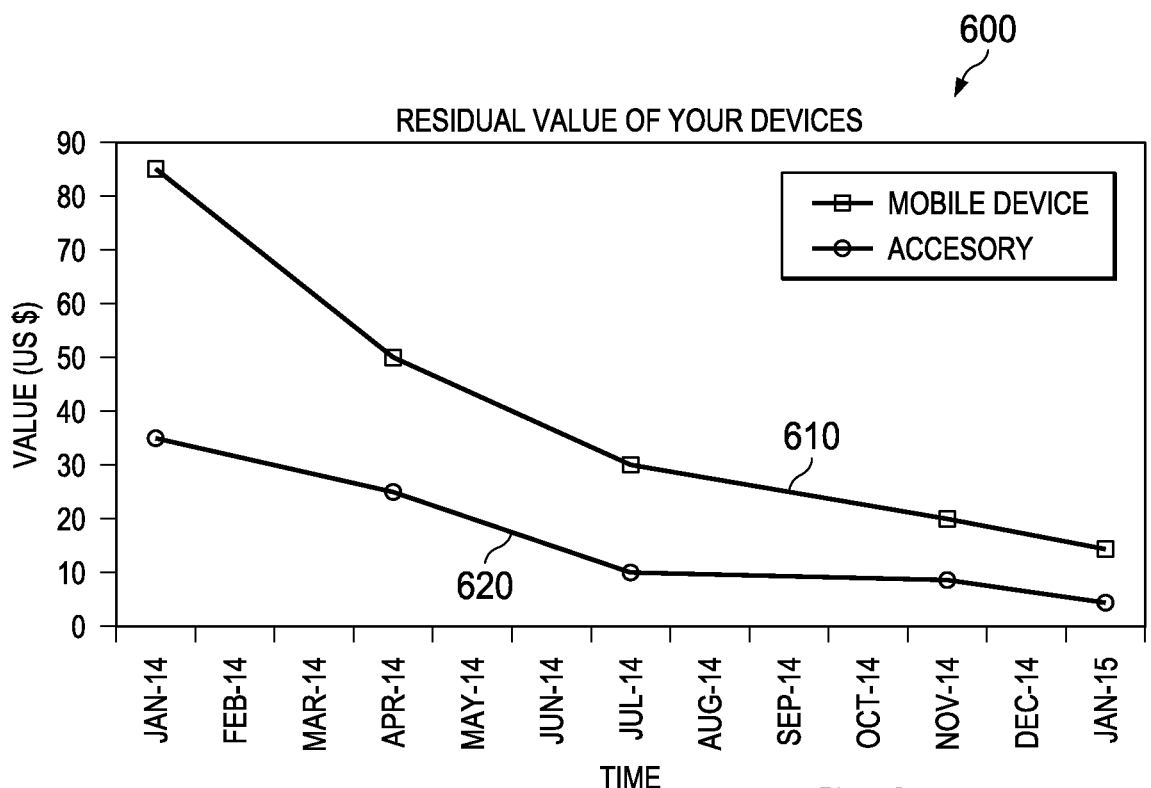
FIG. 6 is an chart of an embodiment of how residual value may be represented and displayed on a mobile device.

FIG. 6 is a representative graph 600 that the system 100 may provide to a user of electronic devices depicting the residual value of such devices. In this example, a user of a mobile device and accessory would be notified of the declining residual value of similar devices over a period of months. Line 610 may represent the declining value of similar mobile devices, while line 620 may represent the declining value of similar accessories. By being able to provide a visual representation of the declining residual value of a user's devices, the system may encourage users to upgrade or trade in such devices and potentially increase turnover velocity for users to acquire new, more desirable electronic devices.

Figure 7:
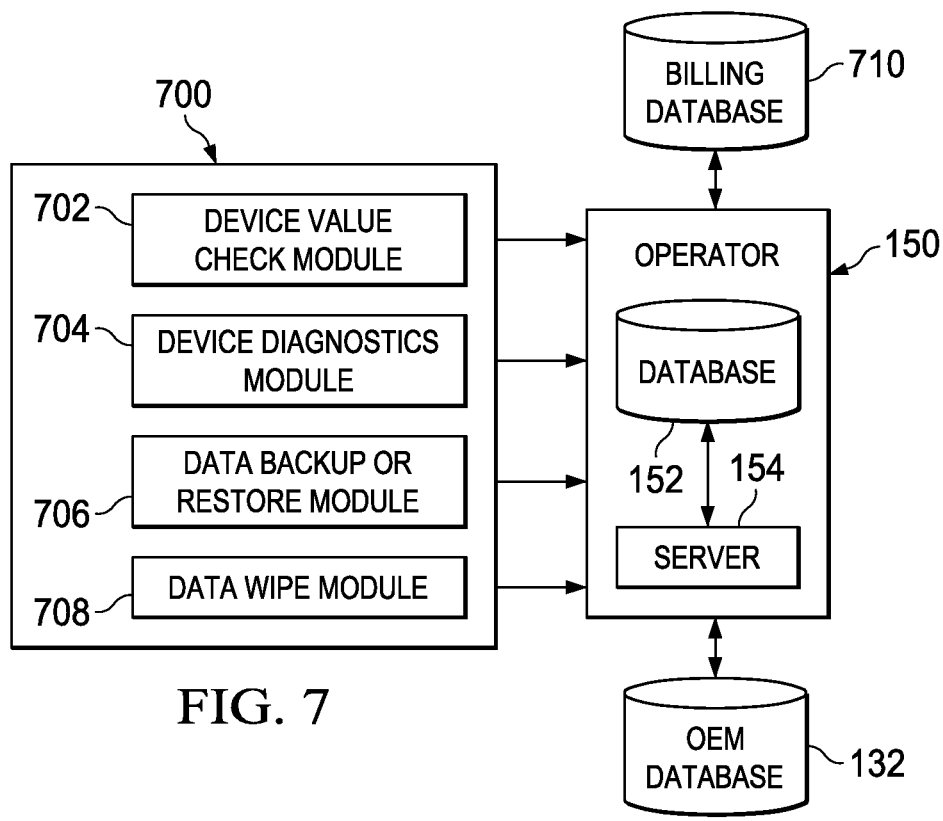
FIG. 7 is a functional block diagram of an embodiment of a mobile device with residual valuation software system.

In some embodiments, portions of the system 100 may be implemented on the mobile device rather than at the system. FIG. 7 is a functional block diagram of an embodiment of a mobile device with residual valuation software system 700. The system 700 may comprise a device value check module 702 which may be employed to determine whether a mobile device user is eligible for trading in or upgrading his or her device. In some embodiments, a user may solicit device value check module 702 to initiate an eligibility inquiry at a his or her request or instruct device value check module 702 to periodically perform such an inquiry and alert him or her once device value check module 702 determines a user is eligible. In another example, an OEM or provider may configure device value check module 702 to periodically initiate an eligibility inquiry of a device user and alert him or her once eligible for a trade in or upgrade. For example, an OEM or provider may implement device value check module 702 to encourage a device user to initiate trade in or upgrade their device.

Device value check module 702 may consult the operator systems 150 to determine a device user's eligibility to trade in or upgrade a device. Information from a carrier or provider billing database 710 may be gathered by the operator system 150 to determine such eligibility. In some embodiments, the operator system 150 may store such data in a operator database 152. The device value check module 702 may alert a device user that he or she is eligible to upgrade or trade in a device and trade-in eligibility. In embodiments in which a user may instruct device value check module 702 to perform an eligibility inquiry, a user also may instruct device value check module 702 to indicate his or her current eligibility status and/or provide a timeline of when such status may change. When alerting a user that he or she is eligible to trade in or upgrade a device, the device value check module 702 also may inquire whether such an exchange is desired. In some embodiments, the device value check module 702 may transmit a user's decision to the operator database 152 for storage.

System 700 also may further comprise device diagnostics module 704 which may be run if a user indicates an interest in exchanging his or her device to gather information stored locally on the mobile device for use in identifying an appropriate diagnostic analysis. Information gleaned from a mobile device may include the manufacturer and/or model of a device, or a device's operating system and/or firmware version. The device diagnostics module 704 may transmit such information to operator system 150 to identify particular device parameters for evaluation and diagnosis by the device diagnostics module 704 for use in a residual value calculation. For example, the device diagnostics module 704 may receive data stored on the backend database 152 and/or an OEM database 130 and use a device's information to identify an appropriate diagnostic analysis to be performed by the device diagnostics module 704.

The device diagnostics module 704 may conduct a diagnostic analysis based on OEM information (such as received from the OEM database 132) and/or based on operator information (such as received from the operator system 150) based on particular parameters identified to the device diagnostics module 704. Parameters for diagnosis may include:

- external device components such as a volume, power, or other button, speakers, a microphone, a camera and/or camera flash, or a USB, headphone or other input/output connection;
- internal device components such as memory storage, screen pixels or a backlight, a battery, voltage reading and/or charging capability, Bluetooth, GPS, NFC, Wi-Fi, cellular data, or other radio, light, pressure, temperature, humidity, or other sensors, a gyroscope, accelerometer or vibration components; or infrared capability; and/or
- other data stored in a device such as talk time accrued or storage availability.

Even more specifically, the diagnostics applied may include the following parameters and/or use the following described processes for testing the parameters:

- Screen Pixels (dead, hot): can fill whole screen and rotate colors with operator observation and select those areas with problems Screen Touch: can have operator trace specific patterns
Screen Surface (scratches): if mirror available at assessment point, can use camera (or other device) and take pictures and then use computer vision techniques to look for scratches on screen
Microphone and/or speaker: can place device in an enclosure and tests microphone and speaker at same time
Camera: can place in an enclosure and take pictures and use image recognition to test color or camera lens scratches
Flash: can place in an enclosure and use light sensor from this;
GPS: can turn on GPS and compare to course network
Accelerometer: can have operator twist and tilt phone
Gyroscope: may be same as accelerometer
Vibration: can turn on ringer vibration and see what it does to accelerometer
Battery:
   Just use health returned by device
   Take measurements and see how battery depletes given certain amount of time
   Try to charge and see what maximum goes up to
   Voltage reading:
      At full charge voltage is low means dead cell
      If apply load and voltage drops too much also means there is a problem
Phone: can make a phone call (dial a number and record the information)
Check a data connection
NFC, Bluetooth, Wi-Fi and other wireless protocols
Gravity
Infrared
Backlight
Proximity/distant sensor
Light sensor
Pressure sensor
Temperature
Humidity
Power button
Volume button The system 700 may comprise a data backup or restore module 706 which may inquire whether a user desires to backup device content to a database in the system 100 or in an external database (such as the operator database 152). The data backup or restore module 706 may provide confirmation of such backup to a user, which may encourage him or her to proceed with a device exchange.

The system 700 also may comprise a data wipe module 708 to remove a user's content (i.e., "wipe" content) that may be stored on a mobile device. In some embodiments, a user may invoke the data backup or restore module 706 and data wipe module 708 as part of a trade-in or upgrade exchange and/or at will. For example, if a user desires to give away a mobile device, the data backup or restore module 706 may be initiated by him or her to securely backup device content and then the data wipe module 708 may be used to prevent any data from being transferred to the person receiving the mobile device.

Figure 8:
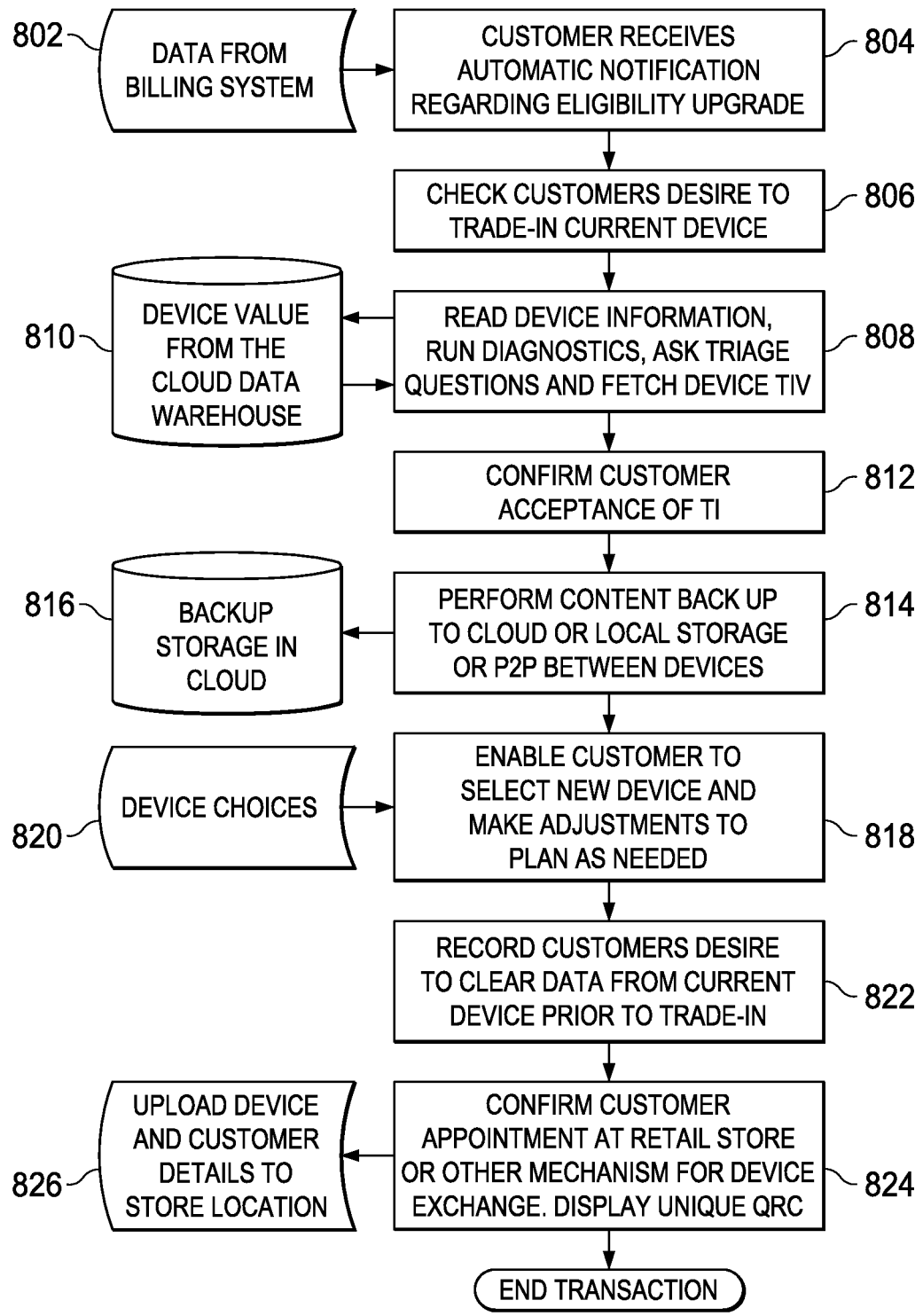
FIG. 8 is a flowchart of an embodiment of a method by which a user may be informed of a value for his or her mobile device and execute an exchange.

Referring now to FIG. 8, a flowchart of a method by which a user may be informed of a value for his or her mobile device and execute an exchange is shown. The main processor 102 may examine data from an external carrier billing database 802 and identify a device user eligible for a trade-in or upgrade. At step 804, the system 100 may notify a user of his or her eligibility to exchange a device, and inquire as to whether the user has interest in exchanging their current device at step 806. Once a user indicates an interest at step 806, step 808 activates device diagnostics module 704. Still referring to action 808, questions are asked of a user regarding the physical condition of the mobile device that cannot be determined from device diagnostics module 704, such as whether the screen glass or device body is cracked. The user's response and data collected from device diagnostics module 704 may be transmitted to a cloud-based data warehouse 810 to determine the device's residual (trade-in) value.

The mobile device trade-in value may then be displayed to the user as part of step 808. In some embodiments, the trade-in value displayed to the user may include an itemized list of characteristics that decrease the trade-in value of the mobile device. For example, the status of the system components may be displayed. Alongside the status of the system components that are deemed damaged or not functioning adequately, an indication of the impact of such damage to the trade-in value of the device may be displayed. For example, the status may display that the screen has a dead or malfunctioning pixel, and this damage decreases the trade-in value by $50. Such functionality may aid the customer in better understanding the exact reason for a lower value of the traded-in device and may also assist store personnel in performing the transaction with a better customer satisfaction by eliminating the need for a customer to look for alternative solutions to repair a device they no longer intend to keep. As a further example, table 1 below illustrates a possible listing provided to a user for the status of the system components that are deemed damaged or not functioning adequately and an indication of the impact of such damage to the trade-in value of the device. It should be understood that Table 1 is presented by way of example only, and not as limitation.

TABLE 1

| Device Function | Status | Impact to Device Value |
|---|---|---|
| Memory/Storage | 64 GB - Functioning | |
| Screen | Dead pixels detected - Glass replacement required | −$50 |
| Charging port | Dead | −$25 |
| On/Off switch | Functional | |
| ... | | |
| Total Impact to Retained Value | | −$75 |

At step 812, user acceptance of the trade-in value is confirmed. At step 814, content of the mobile device may be backed up to a cloud-based storage solution 816. In some cases, step 814 may back-up the mobile device to local storage or a peer to peer transfer of the data may occur to a different mobile device. The data transfer may be accomplished by invoking data backup restore module 706.

At step 818, the user may be presented with upgrade devices and updated carrier plan options retrieved from storage 820 and adjustments are made based on the user's decisions. At step 822, the user may be asked whether data wipe module 708 should be invoked at the time of the exchange and the user's decision may be recorded. The user may be provided with this confirmation on the device again immediately before the exchange takes place. At step 824, methods for the user to exchange the device may be presented to and selected by the user. For example, an appointment may be made at a physical store location and confirmed by the user and inserted into the user's on-device calendar or instructions for receiving the upgrade device and exchanging the current device by mail may be provided. Still referring to action 824, a unique Quick Response Code or other scannable code may be displayed on the device. Such code allows carrier personnel to invoke all data related to the user's exchange transaction, and transmitted and stored on a backend system 150. For example, an employee at a carrier store or at a recycle facility may scan the code upon receipt of the mobile device being traded in. Once the appointment or return shipping is confirmed at step 824, details of the exchange may be written to database 826.

Figure 9:
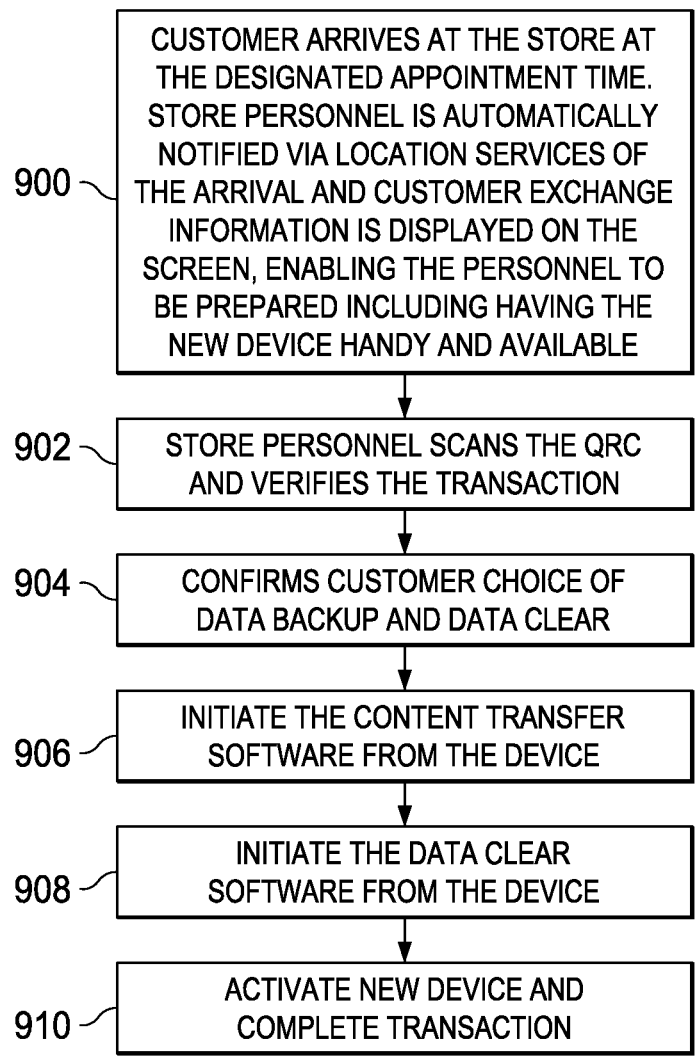
FIG. 9 is a flowchart of an embodiment of a method for exchanging a device at a physical location.

Referring now to FIG. 9, a flowchart illustrates a method for exchanging a device at a physical location. At step 900, carrier personnel may be alerted of a user's arrival at a physical location and the user's scannable code may be generated on the device screen. Carrier personnel may scan the code and verify the transaction at step 902. At step 904, carrier personnel may review the data and confirm the user's choices with regard to backing up and deleting data. At step 906, data backup or restore module 706 may be initiated to transfer content on the device as described herein. At step 908, data wipe module 708 may be invoked and a user's personal information may be located and deleted from the mobile device. Such locations and information may include contacts information, personal SMSs and MMSs, image and video files, other apps installed on the phone that may store personal usernames and passwords, and/or books or other documents. At step 910, a user's new device may be activated and the transaction may be completed.

Figure 10:
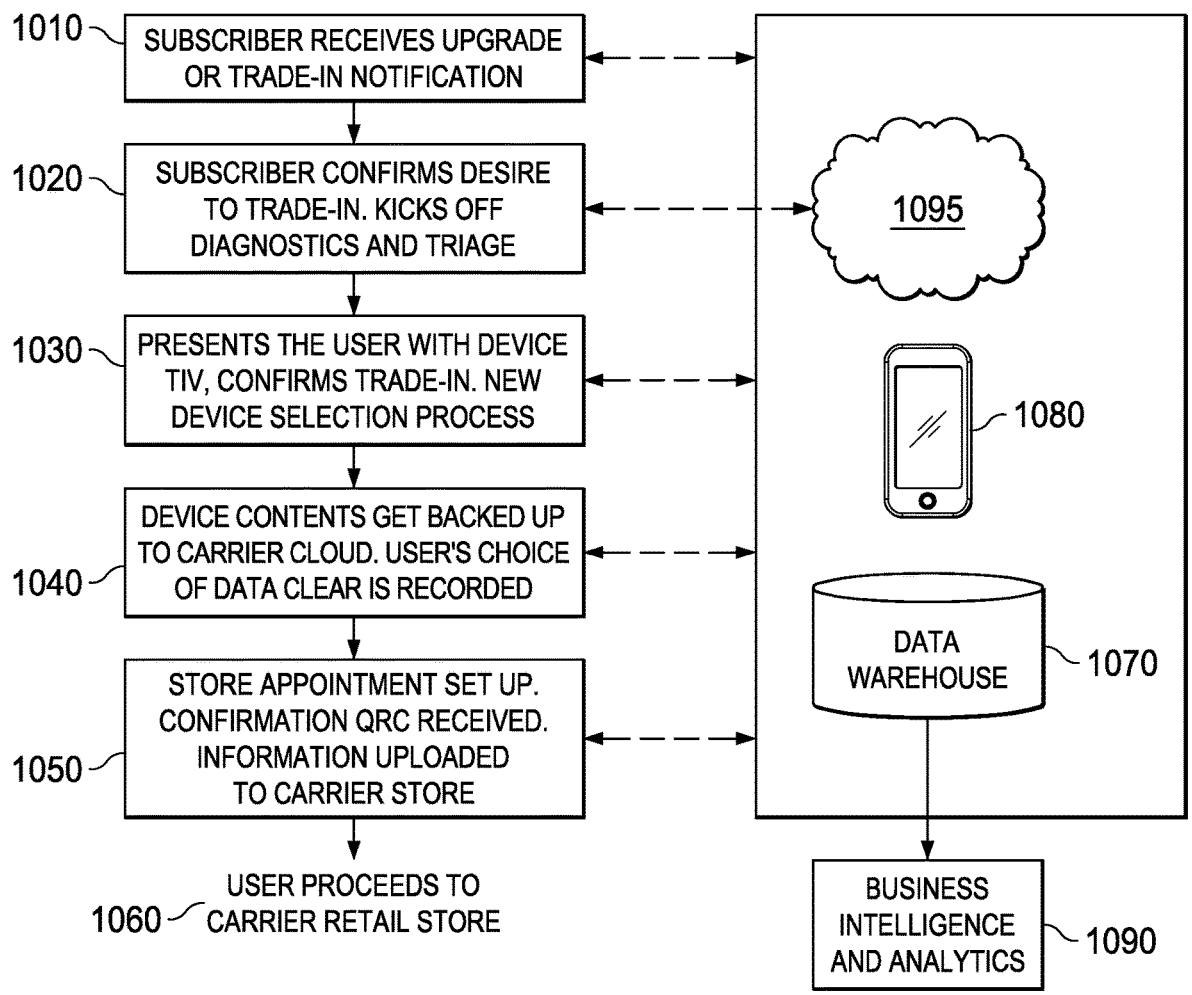
FIG. 10 is a diagram of an embodiment of a device trade-in offer and acceptance system and process.

FIG. 10 is a diagram of an embodiment of a device trade-in offer and acceptance. At step 1010, a user may receive an upgrade or trade-in notification at mobile device 1080. At step 1020, the user may confirm a desire to trade-in and initiate the diagnostic and triage questioning on mobile device 1080. At step 1030, data warehouse 1070 may be consulted and the user may be presented with a trade-in value for the mobile device 1080. The user may confirm the trade-in and select a new mobile device. At step 1040, the mobile device 1080 contents may be backed up to the carrier cloud 1095. The user's choice of data clear preference is recorded at step 1040 as well. At step 1050 a store appointment may be set up for return of the mobile device 1080. A confirmation QRC code may be delivered to mobile device 1080. Information gathered during the trade-in process may be uploaded to the carrier store at step 1050 as well. At step 1060, the user may proceed to the carrier store. At step 1090, business intelligence and analytics may be gathered from the data warehouse 1070 for use in determining trade-in values and gauging market characteristics.

Figure 11:
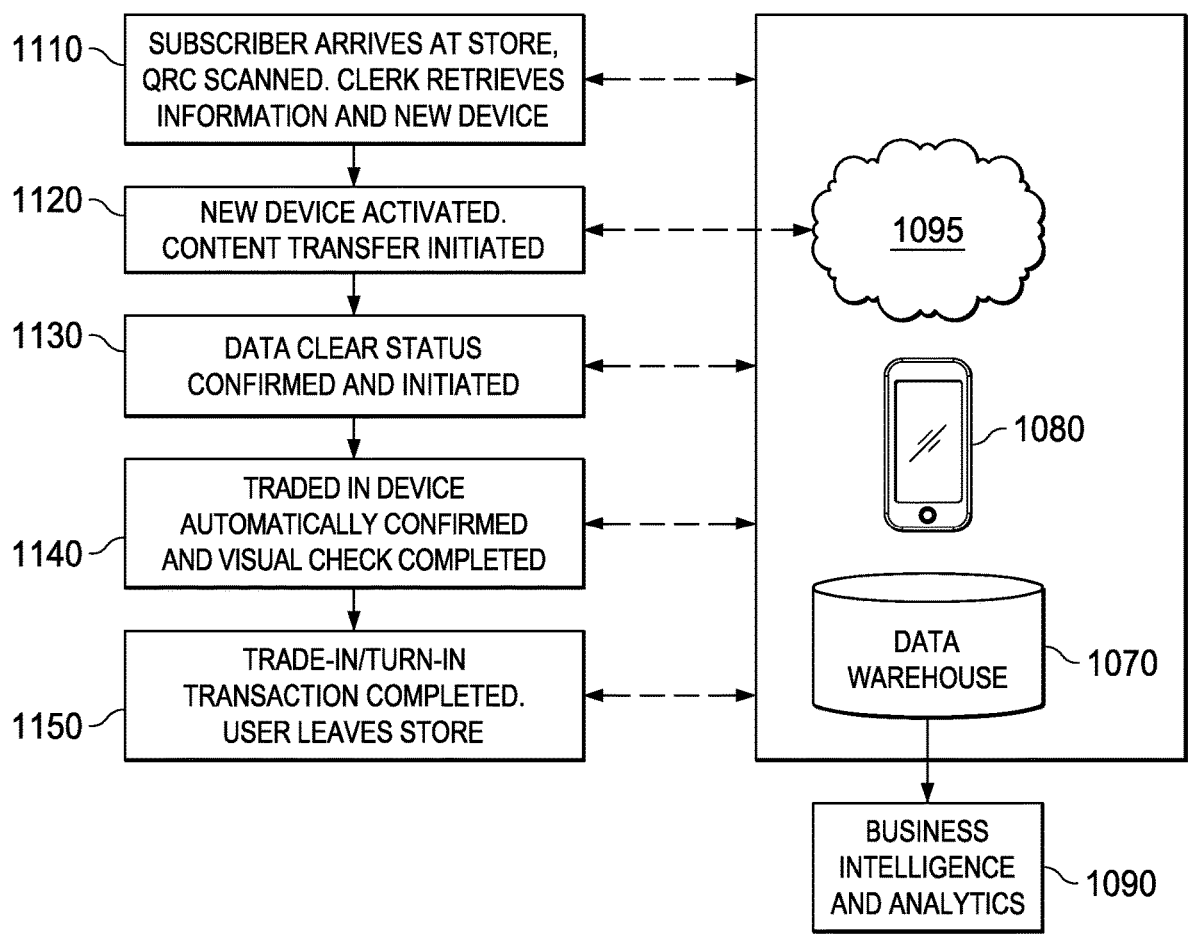
FIG. 11 is a diagram of an embodiment of a process used after device trade-in offer and acceptance.

FIG. 11 is a diagram of an embodiment of a process used after device trade-in offer and acceptance. At step 1110, the user may arrive at the carrier retail store. The QRC code generated in step 1050 may be presented to a clerk at the store, or at a kiosk configured to receive the mobile device 1080. The clerk or kiosk may retrieve the information for device trade-in associated with the QRC code. At step 1120, a new mobile device is activated for the user and the data back-up is retrieved from cloud 1095 and installed on the new mobile device. The data wipe status is confirmed and initiated for mobile device 1080 at step 1130. At step 1140, the traded in mobile device 1080 may be automatically confirmed as received and a visual inspection of the mobile device 1080 may be accomplished. At step 1150, the trade-in transaction may be completed and the user may leave the store with their new mobile device.

As used in the disclosures and any appended claims, the terms "embodiment" and "example embodiment" do not necessarily refer to a single embodiment, although it may, and various example embodiments may be readily combined and interchanged to form a single embodiment as would be understood by one of ordinary skill in the art, without departing from the scope or spirit of the present embodiments. Further, the terminologies as used herein is for the purpose of describing example embodiments only, and are not intended to be limitations. In this respect, as used herein, the term "in" may include "in" and "on," and the terms "a," "an" and "the" may include singular and plural references.

While various embodiments have been described above, it should be understood that they have been presented by way of example only, and not as limitation. Thus, the breadth and scope of a described embodiment should not be limited by any of the above-described exemplary embodiments but rather should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer-readable instructions stored on a computer-readable media that are connected thereto.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, or other interconnected computing environments. Such networked computing environments include hardware and software infrastructures configured to form a virtual organization comprised of multiple resources which may be in geographically-disperse locations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims.

Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method to initiate mobile device trade-in, the method comprising:
    transmitting, via a network from a mobile device to a server, a manufacture identifier and a model identifier obtained from the mobile device;
    receiving, from the network and by the mobile device, a first diagnostic test and a second diagnostic test determined based on the manufacture identifier and the model identifier;
    executing, by the mobile device, the first diagnostic test, wherein executing the first diagnostic test comprises requesting an operator to trace a pattern on a touch screen, and analyzing output of the touch screen of the mobile device to obtain first information;
    executing, by an application on the mobile device, the second diagnostic test to determine second information, wherein the second information comprises identification of one or more components to repair, and wherein executing the second diagnostic test comprises:
        activating ringer vibration on the mobile device, and evaluating an impact, on an accelerometer of the mobile device, of the ringer vibration;
    transmitting, by the application on the mobile device, the first information and the second information to the server, wherein the server receives information from a plurality of mobile devices;
    initiating a trade-in value calculation based upon an event related to the mobile device;
    receiving first data related to the mobile device from a computer processor configured to communicate with one or more servers configured to interact with one or more external data sources, wherein the first data comprises internal metrics related to return rates of other mobile devices that are the same model as the mobile device and data from repair websites related to repair rates and costs of the other mobile devices that are the same model as the mobile device, and wherein the one or more servers are further configured to communicate with one or more mobile devices;
    retrieving second data from an analytic database, wherein the second data comprises at least one of model specific data of the mobile device or device specific data of the mobile device;
    receiving, from the server, a listing of statuses of components to repair of the mobile device and an impact of the statuses on a trade-in value for the mobile device;
    determining the trade-in value for the mobile device based upon the first information, the second information, the first data, the second data, and the impact of the statuses on the trade-in value; wherein the trade-in value includes a list of components that decrease the trade-in value and an amount that each of the components decreases the trade-in value; and
    transmitting the trade-in value.

2. The method of claim 1 wherein the first diagnostic test further analyzes one or more components of the mobile device, wherein the one or more components of the mobile device comprises at least one of external device components or internal components.

3. The method of claim 1 wherein the first diagnostic test further analyzes one or more components of the mobile device, and wherein the one or more components comprises at least one of volume button, power button, speaker, microphone, camera, camera flash, USB, headphone, input/output connection, memory storage, backlight, battery, Bluetooth, NFC, Wi-Fi, cellular data, gyroscope, vibration component, light sensor, pressure sensor, temperature sensor, humidity sensor, or infrared component.

4. The method of claim 1 wherein the event comprises a physical trigger.

5. The method of claim 1 wherein the event comprises a physical trigger, and wherein the physical trigger is based on at least one of:
    lapse of a pre-determined time period after a purchase date of the mobile device;
    power recycling of a phone or device;
    or greater than factory estimated time to charge the battery.

6. The method of claim 1 wherein the event comprises a request from a user via the application.

7. The method of claim 1 wherein the first data comprises user reviews of the other mobile devices that are the same model as the mobile device, and wherein the one or more servers, from which the first data is received, comprises a social intelligence server configured to interact with a web crawler system.

8. The method of claim 1 wherein the first data comprises historical data related to prices of the other mobile devices before and after release of new versions of the other mobile devices.

9. The method of claim 1 further comprising displaying via the application the listing of statuses and the impact of the statuses on the mobile device via the application.

10. The method of claim 1 further comprising displaying the trade-in value via the application on the mobile device based on the transmitted trade-in value; and displaying a listing of characteristics that decrease the trade-in value of the mobile device.

11. The method of claim 1 further comprising displaying the trade-in value via the application on the mobile device based on the transmitted trade-in value; displaying a listing of characteristics that decrease the trade-in value of the mobile device; and displaying the amount of the decrease in the trade-in value for one or more of the characteristics that decrease the trade-in-value.

12. A method to initiate mobile device trade-in, the method comprising:
   transmitting, via a network from a mobile device to a server, a manufacture identifier and a model identifier obtained from the mobile device;
   receiving, from the network and by the mobile device, a first diagnostic test and a second diagnostic test determined based on the manufacture identifier and the model identifier;
   executing, by the mobile device, the first diagnostic test, wherein executing the first diagnostic test comprises requesting an operator to trace a pattern on a touch screen, and analyzing output of the touch screen of the mobile device to obtain first information;
   executing, by an application on the mobile device, the second diagnostic test to determine second information, wherein the second information comprises identification of one or more components to repair, and wherein executing the second diagnostic test comprises:
      activating ringer vibration on the mobile device, and
      evaluating an impact, on an accelerometer of the mobile device, of the ringer vibration; and
   transmitting, by the application on the mobile device, the first information and the second information to the server,
   wherein the server determines a trade-in value based on the first information, the second information, first data, and second data retrieved from an analytic database, wherein the first data comprises historical data related to prices of other mobile devices before and after release of new versions of the other mobile devices and data from repair websites related to repair rates and costs of the other mobile devices that are the same model as the mobile device, wherein the first data is received from a computer processor configured to communicate with one or more servers, wherein the one or more servers are configured to communicate with one or more mobile devices, and wherein the second data includes at least one of model specific data of the mobile device or device specific data of the mobile device.

13. The method of claim 12 further comprising displaying the trade-in value via the application on the mobile device based on a received trade-in value; displaying a listing of characteristics that decrease the trade-in value of the mobile device; and displaying an amount of the decrease in the trade-in value for one or more of the characteristics that decrease the trade-in-value.

14. The method of claim 12 further comprising displaying a listing of statuses and an impact of statuses on the mobile device via the application.

15. The method of claim 12 wherein the one or more components comprises at least one of volume button, power button, speaker, microphone, camera, camera flash, USB, headphone, input/output connection, memory storage, backlight, battery, Bluetooth, GPS, NFC, Wi-Fi, cellular data, gyroscope, light sensor, pressure sensor, temperature sensor, humidity sensor, or infrared component.

16. A method to initiate mobile device trade-in, the method comprising:
   transmitting, via a network from a mobile device to a server, a manufacture identifier and a model identifier obtained from the mobile device;
   receiving, from the network and by the mobile device, a first diagnostic test and a second diagnostic test determined based on the manufacture identifier and the model identifier;
   executing, by the mobile device, the first diagnostic test, wherein executing the first diagnostic test comprises requesting an operator to trace a pattern displayed on a touch screen, and analyzing output of the touch screen of the mobile device to obtain first information;
   executing, by an application on the mobile device, the second diagnostic test to determine second information, wherein the second information comprises identification of one or more components to repair, and wherein executing the second diagnostic test comprises:
      activating ringer vibration on the mobile device, and
      evaluating an impact, on an accelerometer of the mobile device, of the ringer vibration;
   receiving first data related to the mobile device from a computer processor configured to communicate with one or more servers configured to interact with one or more external data sources, wherein the first data comprises internal metrics related to return rates of other mobile devices that are the same model as the mobile device and data from repair websites related to repair rates and costs of the other mobile devices that are the same model as the mobile device, and wherein the one or more servers are further configured to communicate with one or more mobile devices;
   retrieving second data, wherein the second data includes at least one of model specific data of the mobile device or device specific data of the mobile device;
   determining a trade-in value based on the first information, the second information, the first data, the retrieved second data, and an impact of statuses on the trade-in value, wherein the trade-in value includes a list of components that decrease the trade-in value and an amount that each of the components decreases the trade-in value; and
   transmit the determined trade-in value to the mobile device via the application on the mobile device.

17. The method of claim 16 wherein the one or more components comprises at least one of volume button, power button, speaker, microphone, camera, camera flash, USB, headphone, input/output connection, memory storage, screen pixels, backlight, battery, Bluetooth, GPS, NFC, Wi-Fi, cellular data, gyroscope, light sensor, pressure sensor, temperature sensor, humidity sensor, or infrared component.

18. The method of claim 16 further comprising transmitting, to the mobile device for display via the application, a listing of characteristics that decrease the trade-in value of the mobile device and an amount of the decrease in the trade-in value for one or more of the characteristics that decrease the trade-in-value.

19. The method of claim 16 wherein the first data comprises historical data related to prices of the other mobile devices before and after release of new versions of the other mobile devices.

20. The method of claim 16 wherein the first data further comprises user reviews of the other mobile devices that are the same model as the mobile device, and wherein one or more of the servers, from which the first data is received, comprises a social intelligence server configured to interact with a web crawler system.

21. The method of claim 1, wherein the mobile device executes the second diagnostic test by capturing an image with a camera of the mobile device when the camera is placed in an enclosure, and performing image recognition on the image to detect a scratch on a lens of the camera of the mobile device.

\* \* \* \* \*